(12) United States Patent
Riley et al.

(10) Patent No.: US 9,031,572 B2
(45) Date of Patent: May 12, 2015

(54) METHOD AND APPARATUS FOR ESTIMATING SATELLITE POSITIONING RELIABILITY

(75) Inventors: Wyatt T. Riley, Chesterbrook, PA (US); William J. Morrison, San Diego, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/331,761

(22) Filed: Dec. 20, 2011

(65) Prior Publication Data

US 2012/0178470 A1 Jul. 12, 2012

Related U.S. Application Data

(60) Provisional application No. 61/426,032, filed on Dec. 22, 2010.

(51) Int. Cl.
| | | |
|---|---|---|
| *H04W 24/00* | (2009.01) | |
| *G01S 19/20* | (2010.01) | |
| *G01S 5/02* | (2010.01) | |
| *G01S 19/42* | (2010.01) | |
| *G01S 19/46* | (2010.01) | |

(52) U.S. Cl.
CPC ............ *G01S 19/20* (2013.01); *G01S 5/0257* (2013.01); *G01S 19/42* (2013.01); *G01S 19/46* (2013.01)

(58) Field of Classification Search
CPC .......... H04N 21/4622; H04N 21/4722; H04N 21/6118; H04N 21/6125; H04N 21/858; G01S 19/46; G01S 19/48

USPC ................. 455/456.1, 456.6; 342/357.28
See application file for complete search history.

(56) References Cited

U.S. PATENT DOCUMENTS

| | | | |
|---|---|---|---|
| 6,271,789 B1 | 8/2001 | Beerhold | |
| 6,429,814 B1 * | 8/2002 | van Diggelen et al. | .. 342/357.33 |
| 6,707,422 B2 | 3/2004 | Sheynblat et al. | |
| 6,839,020 B2 * | 1/2005 | Geier et al. | ............. 342/357.64 |
| 7,053,826 B1 * | 5/2006 | McBurney et al. | ...... 342/357.64 |
| 7,558,534 B2 | 7/2009 | Stein et al. | |
| 7,746,272 B2 | 6/2010 | Vollath | |
| 7,949,491 B2 * | 5/2011 | Smartt et al. | ................... 702/167 |
| 7,978,127 B2 * | 7/2011 | Ueda et al. | ............... 342/357.23 |
| 8,116,976 B2 * | 2/2012 | Garin et al. | .................... 701/476 |
| 8,242,955 B2 * | 8/2012 | France et al. | ............ 342/357.61 |

(Continued)

FOREIGN PATENT DOCUMENTS

| | | |
|---|---|---|
| EP | 1892540 A1 | 2/2008 |
| WO | WO03089954 | 10/2003 |

OTHER PUBLICATIONS

International Search Report and Written Opinion—PCT/US2011/066508—ISA/EPO—Mar. 16, 2012.

*Primary Examiner* — Kashif Siddiqui
*Assistant Examiner* — Mong-Thuy Tran
(74) *Attorney, Agent, or Firm* — Berkeley Law & Technology Group, LLP (57) ABSTRACT

A position fix of a mobile device is computed based, at least in part, on a plurality of data items. A metric that is indicative of a reliability of the position fix may be generated based, at least in part, on a number of independent ones of the data items and/or an indication of reliability of at least one of the data items. In at least one implementation, the plurality of data items may include SPS satellite signals and/or pseudoranges and an externally obtained position.

22 Claims, 4 Drawing Sheets

(56) References Cited

U.S. PATENT DOCUMENTS

| | | |
|---|---|---|
| 2003/0055614 A1* | 3/2003 | Pelikan et al. .................... 703/2 |
| 2004/0152362 A1* | 8/2004 | Carter et al. ................. 439/660 |
| 2004/0192330 A1* | 9/2004 | Gaal .......................... 455/456.1 |
| 2006/0019679 A1* | 1/2006 | Rappaport et al. ......... 455/456.5 |
| 2007/0216540 A1* | 9/2007 | Riley et al. .................... 340/903 |
| 2008/0051999 A1* | 2/2008 | Mizuochi et al. ............. 701/213 |
| 2009/0210156 A1* | 8/2009 | Riley et al. .................... 701/300 |
| 2010/0073229 A1* | 3/2010 | Pattabiraman et al. .. 342/357.09 |
| 2010/0109945 A1 | 5/2010 | Roh |
| 2010/0117897 A1* | 5/2010 | Riley et al. ................ 342/357.09 |
| 2010/0178934 A1* | 7/2010 | Moeglein et al. ........... 455/456.1 |
| 2010/0203899 A1* | 8/2010 | Sheynblat et al. .......... 455/456.1 |
| 2010/0220005 A1* | 9/2010 | Kosolobov et al. ...... 342/357.12 |
| 2010/0225532 A1* | 9/2010 | France et al. ............ 342/357.23 |
| 2010/0309044 A1* | 12/2010 | Ische et al. ............... 342/357.28 |
| 2011/0037650 A1* | 2/2011 | Lennen .................... 342/357.63 |
| 2012/0077516 A1* | 3/2012 | Osinusi et al. ............. 455/456.1 |
| 2013/0120188 A1* | 5/2013 | Pattabiraman et al. .. 342/357.29 |
| 2013/0265191 A1* | 10/2013 | Ghinamo ................. 342/357.23 |

\* cited by examiner

METHOD AND APPARATUS FOR ESTIMATING SATELLITE POSITIONING RELIABILITY

This application claims the benefit of U.S. Provisional Application No. 61/426,032, filed Dec. 22, 2010, entitled "Satellite Positioning Reliability and Position Input Fault Detection and Isolation," which is hereby incorporated by reference in its entirety and is assigned to the assignee of the currently claimed subject matter.

BACKGROUND

1. Field

Subject matter disclosed herein relates generally to positioning and, more specifically, to performance measures for use in satellite positioning systems.

2. Information

The Global Positioning System (GPS), and other satellite positioning systems (SPSs), may rely on measurement of signal propagation delays of SPS signals traveling from positioning satellites to SPS receivers (e.g., ground-based navigation receivers, etc.). By measuring a signal propagation delay, an SPS receiver may compute a pseudorange measurement from the transmitting satellite to the SPS receiver. If pseudorange measurements can be obtained for an adequate number of satellites at known orbital positions relative to the earth, an SPS receiver may compute an estimated location of the receiver as part of a navigation solution. Typically, pseudorange measurements for four or more satellites are desirable to generate a solution, but in some instances measurements for fewer than four satellites may be used. In some situations, a navigation solution and/or "position fix" may be computed from information obtained from a diversity of sources including pseudorange measurements in combination with, for example, an externally obtained initial position. The accuracy of the initial position varies significantly, depending on the source of the initial position. For example, an uncertainty in an initial position may be as low as 15.0 meters for an initial position derived merely from acquisition of a signal from an IEEE std. 802.11 access point. For an initial position derived merely from knowledge of a location of current serving cell in a cellular communication network, an uncertainty in the initial position may be greater than 10.0 km.

A position fix often includes an estimated location of a mobile device and a measurement of uncertainty about or accuracy of the estimated location. For example, accuracy of individual measurements used for computing an estimated location may contribute to an overall accuracy of the computed location estimate. In the case of pseudorange measurements obtained by acquiring SPS signals transmitted by satellites, the accuracy of the pseudorange measurements may be affected by many factors including, for example, thermal noise.

While techniques for characterizing an uncertainty of a location estimate may account for accuracies of individual measurements used to compute the location estimate, such metrics do not account for situations where one or more data items used for computing a location estimate are completely erroneous (e.g., inaccurate beyond a perceived indication of uncertainty). While known or perceived conditions such as the thermal measurement noise level may be used for quantifying an uncertainty of a measurement value, it should be recognized that other conditions and/or events may skew a measurement value such that the value is inconsistent with the perceived level of accuracy. As such, a measurement of uncertainty of a computed location estimate may be misleading or otherwise overstate a usefulness of a position fix. Additional or alternative techniques for characterizing a usefulness of a computed position fix are desirable.

BRIEF DESCRIPTION OF THE FIGURES

Non-limiting and non-exhaustive implementations will be described with reference to the following figures, wherein like reference numerals refer to like parts throughout the various figures unless otherwise specified.

SUMMARY

In some implementations, a machine implemented method for determining a metric related to positioning accuracy, comprises: obtaining a plurality of data items at a mobile device; computing a position fix of the mobile device based, at least in part, on the plurality of data items; and determining a metric indicative of a reliability of the position fix based, at least in part, on a number of independent ones of the data items and/or an indication of reliability of at least one of the data items.

In certain implementations, an apparatus comprises: a position fix computation unit to compute a position fix of the apparatus based, at least in part, on a plurality of data items; and a reliability determination unit to determine a metric indicative of a reliability of the position fix based, at least in part, on a number of independent ones of the data items and/or an indication of reliability of at least one of the data items.

In some other implementations, an article comprises: a non-transitory storage medium having machine-readable instructions stored thereon which are executable by a special purpose computing apparatus to: obtain a plurality of data items at a mobile device; compute a position fix of the mobile device based, at least in part, on the plurality of data items; and determine a metric indicative of a reliability of the position fix based, at least in part, on a number of independent ones of the data items and/or an indication of reliability of at least one of the data items.

In various implementations, an apparatus for determining a metric related to positioning accuracy, comprises: means for obtaining a plurality of data items at a mobile device; means for computing a position fix of the mobile device based, at least in part, on the plurality of data items; and means for determining a metric indicative of a reliability of the position fix based, at least in part, on a number of independent ones of the data items and/or an indication of reliability of at least one of the data items.

DETAILED DESCRIPTION

Reference throughout this specification to "one implementation," "an implementation," "certain implementations," or "various implementations" means that a particular feature, structure, or characteristic described in connection with a described implementation may be included in at least one implementation of claimed subject matter. Thus, appearances of the phrase "in one example implementation," "in an example implementation," "in certain example implementations," or "in various example implementations" in various places throughout this specification are not necessarily all referring to the same implementation(s). Furthermore, particular features, structures, or characteristics may be combined in one or more implementations.

Figure 1:
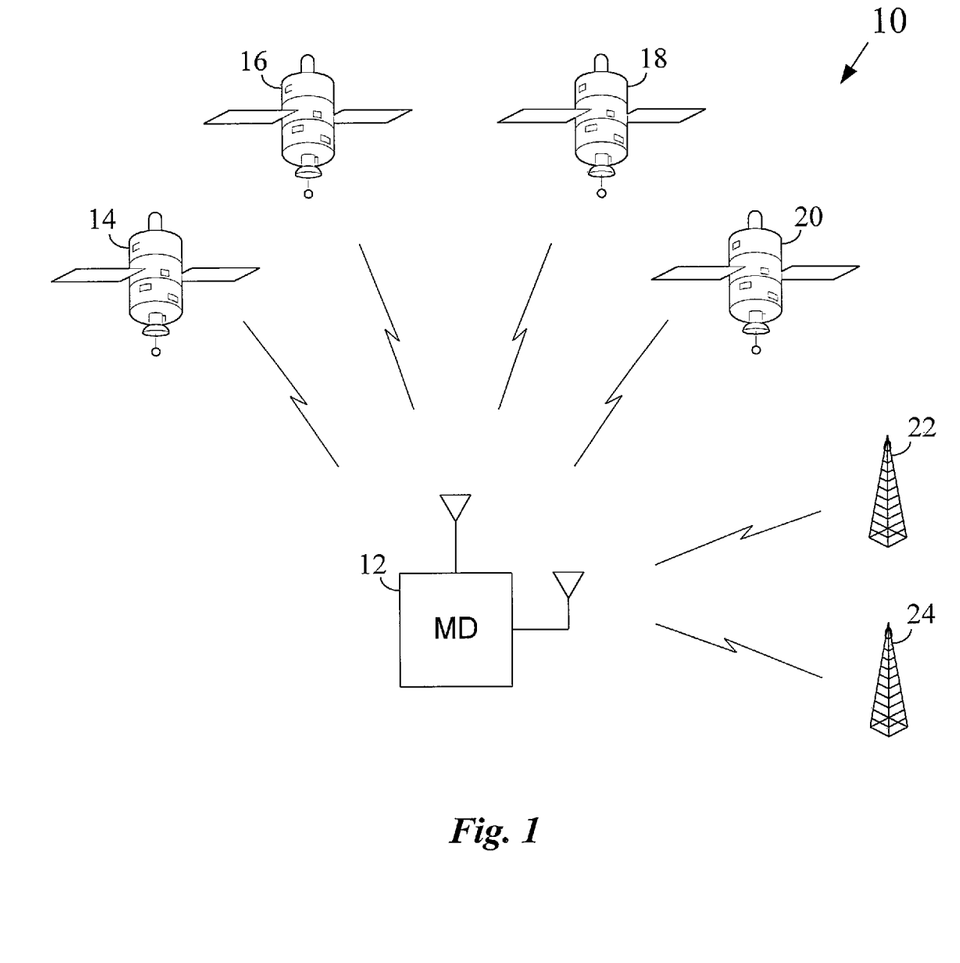
FIG. 1 is a schematic diagram illustrating an example communication arrangement that may incorporate one or more positioning-related features, structures, or techniques described herein in one or more implementations.

FIG. 1 is a schematic diagram illustrating an example communication arrangement 10 that may incorporate one or more positioning-related features, structures, or techniques described herein in one or more implementations. As illustrated, communication arrangement 10 includes a mobile device 12 that may include communication functionality to support communication with one or more satellites 14, 16, 18, 20 of a satellite positioning system (SPS) and communication functionality to support communication with one or more nodes 22, 24 (e.g., base stations, access points, mobile devices, etc.) of a wireless communication network or networks (e.g., wireless personal area networks (PANs), wireless local area networks (LANs), wireless municipal area networks (MANs), wireless wide area networks (WANs), wireless cellular networks, satellite communication networks, paging systems, local multipoint distribution service (LMDS) networks, multichannel multipoint distribution service (MMDSs) networks, and/or others). The mobile device 12 may include an SPS receiver (e.g., a Global Positioning System (GPS) receiver or the like) to estimate a current position of mobile device 12 (i.e., a position fix) based, at least in part, on SPS signals received from SPS satellites 14, 16, 18, 20. Other information may also be used by the SPS receiver to estimate a current position of mobile device 12 in some implementations. Some of this information may be obtained from, for example, one or more terrestrial wireless communication networks. A position fix may identify a position of mobile device 12 and, in some circumstances, may also provide SPS timing information to mobile device 12.

There are various sources of error in estimating position from acquisition of SPS signals. One source, for example, is undesired cross-correlations with an SPS signal and signals associated with other systems, including other satellite positioning systems. For example, a mobile device that includes a GPS receiver may experience cross-correlations with signals from a Satellite Based Augmentation System (SBAS). Similarly, a device that uses an SBAS may experience cross-correlations with a Quasi-Zenith Satellite System (QZSS), and so on. Position errors may also arise from in an SPS receiver by failing to acquire enough satellites, or the right satellites, before computing an estimate (e.g., such as by exiting from a full sky scan too early, by failing to search for an available satellite, etc.). Another potential source of error in estimating position in an SPS receiver relates to the use of faulty or erroneous external assistance data. If incorrect or faulty assistance data is used, for example, the search for satellites may be corrupted and may contribute to major errors in a computed position fix. Other sources of positioning errors also exist. Positioning errors may lead to a malfunction of corresponding location based applications which, at a minimum, may be very inconvenient for a mobile device user. Techniques are described herein that are capable of improving detection of errors in a computed position fix.

Figure 2:
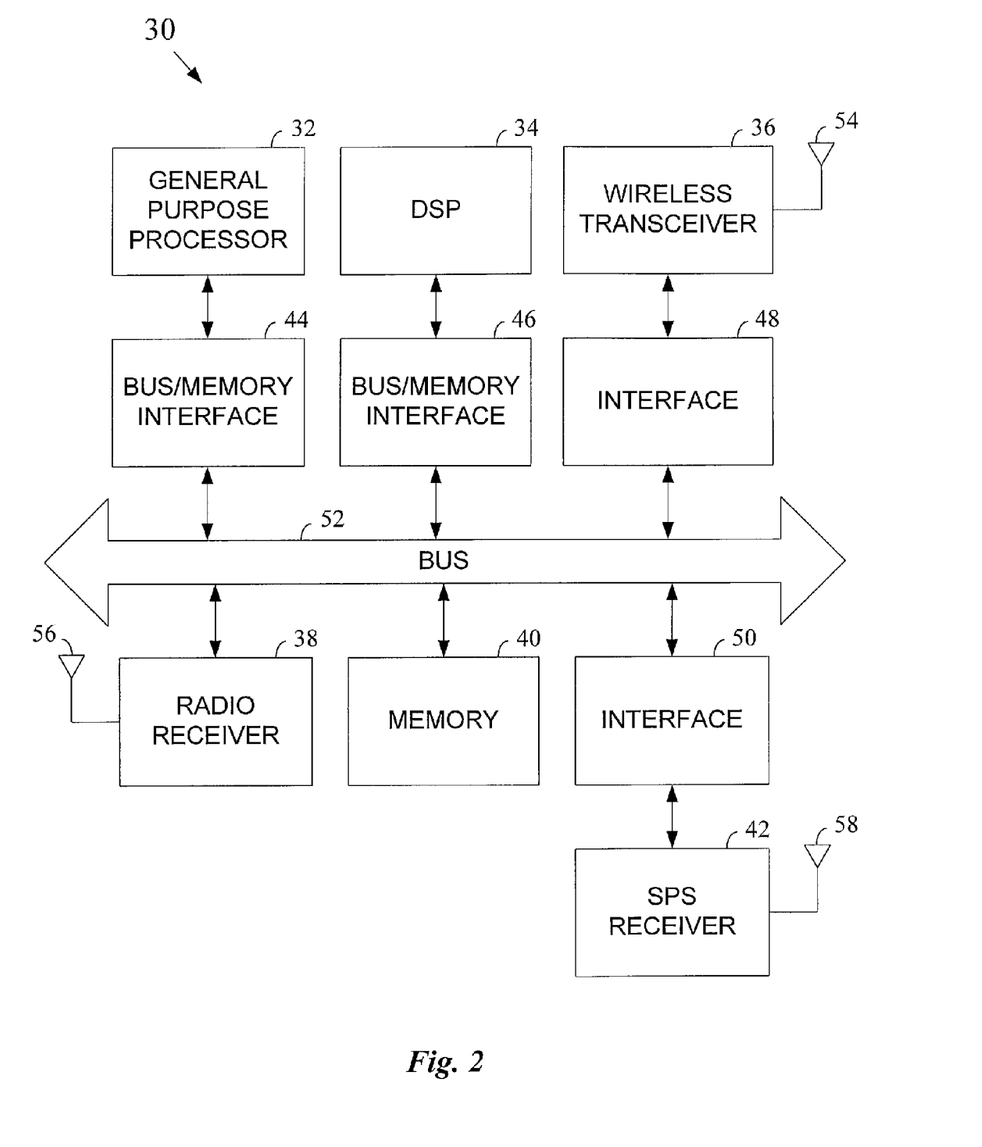
FIG. 2 is a block diagram illustrating an example mobile device architecture that may be used in an implementation.

FIG. 2 is a block diagram illustrating an example mobile device architecture 30 that may be used in an implementation. As illustrated, the mobile device architecture 30 may include, for example, a general purpose processor 32, a digital signal processor 34, a wireless transceiver 36, a radio receiver 38, a memory 40, and an SPS receiver 42. A bus 52 or other alternative structure or structures may be provided for establishing interconnections between various components of the architecture 30. In the illustrated implementation, one or more interfaces 44, 46, 48, 50 may be provided between selected components and bus 52. The wireless transceiver 36, the radio receiver 38, and the SPS receiver 42 may each be coupled to one or more antennas 54, 56, 58, and/or other transducers, to facilitate the transmission and/or reception of wireless signals.

General purpose processor 32 and digital signal processor 34 may comprise digital processing devices that are capable of executing programs to provide one or more functions and/or services to a user. One or both of these processors 32, 34 may be used, for example, to execute an operating system of a corresponding wireless device. One or both of these processors 32, 34 may also be used, for example, to execute user application programs including, for example, location-based applications that may rely on an availability of an accurate position estimate. In addition, one or both of these processors 32, 34 may be used to implement, either partially or fully, one or more of the positioning related processes or techniques described herein in some implementations. It should be appreciated that other forms of digital processing devices may additionally or alternatively be used to perform some or all of the described functions in various implementations including, for example, one or more controllers, microcontrollers, application specific integrated circuits (ASICs), field programmable gate arrays (FPGAs), programmable logic arrays (PLAs), programmable logic devices (PLDs), reduced instruction set computers (RISCs), and/or others, including combinations of the above.

Wireless transceiver 36 may include any type of transceiver that is capable of supporting wireless communication with one or more remote wireless entities. In various implementations, wireless transceiver 36 may be configured in accordance with one or more wireless networking standards and/or wireless cellular standards. In some implementations, multiple wireless transceivers may be provided to support operation with different networks, systems, or devices in a surrounding environment. During mobile device operation, wireless transceiver 36 may be called upon to communicate with a base station or access point of a wireless communication system or network. Radio receiver 38 may be operative for receiving signals from one or more sensors of a sensor network or other transmitting nodes within a surrounding environment.

Memory 40 may include any type of device or component, or combination of devices and/or components, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

SPS receiver 42 may include any type of receiver capable of receiving SPS signals from positioning satellites and processing the signals to provide one or more position estimates for a mobile device. SPS receiver 42 may be configured to operate with any existing or future SPS system including, for example, the Global Positioning System (GPS), the GLONASS system, the Compass system, the Galileo system, the IRNSS system, systems that use Satellite Based Augmentation Systems (SBASs) and/or Ground Based Augmentations Systems (GBASs), and/or other satellite navigation systems. In some implementations, one or more of the processes or techniques described herein may be implemented, either partially or fully, within SPS receiver 42 or a similar structure. It should be appreciated that the mobile device architecture 30 of FIG. 2 represents one possible example of an architecture that may be used in a implementation. Other architectures may alternatively be used. It should also be appreciated that all or part of the various devices, processes, or methods described herein may be implemented using any combination of hardware, firmware, and/or software.

Figure 3:
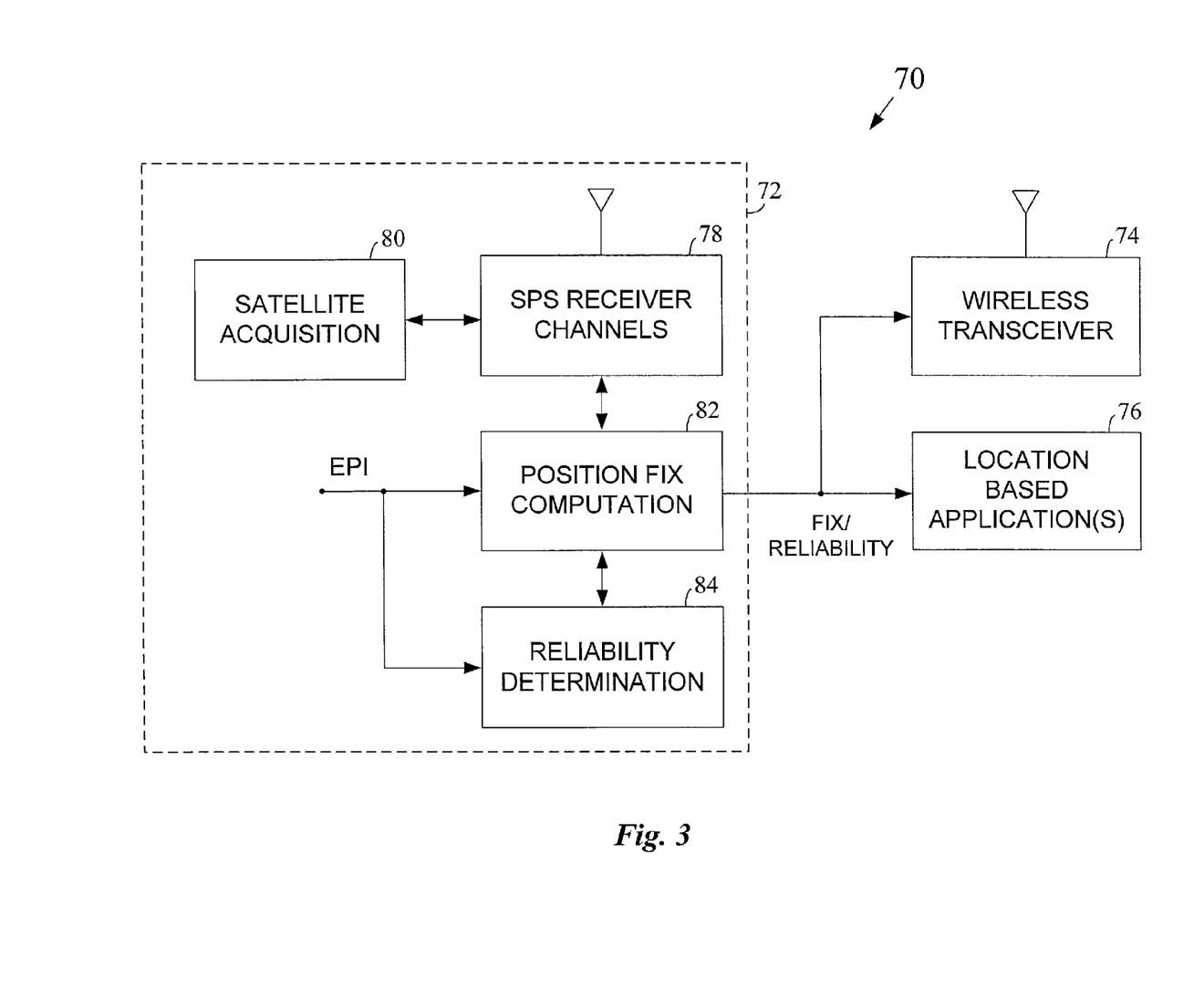
FIG. 3 is a block diagram illustrating functionality within an example mobile device in accordance with an implementation.

FIG. 3 is a block diagram illustrating functionality within an example mobile device 70 in accordance with an implementation. Mobile device 70 may utilize the mobile device architecture 30 of FIG. 2 or other alternative architectures in various implementations. As illustrated in FIG. 3, mobile device 70 may include: an SPS receiver 72, a wireless transceiver 74, and one or more location-based applications 76. SPS receiver 72 is operative for generating a position fix for mobile device 70 based on SPS signals received from SPS satellites and possibly other information. The position fix may identify an estimated position of mobile device 12 and, in some circumstances, may also provide SPS timing information. In addition to the position fix, SPS receiver 72 may also generate information and/or parameters related to the perceived accuracy of the computed position fix. Accuracy information of this type may be important to an ultimate user of the position fix information to gauge whether, for example, the position fix is good enough to rely on for a particular application.

As will be appreciated, it would be desirable that accuracy information related to a position fix be useful in most or all possible circumstances. However, many accuracy related metrics are not good at identifying certain situations such as, for example, position error blowouts. A position error blowout is a condition where a major error exists in a position estimate that is not adequately reflected within the uncertainty metric (e.g., an estimated position may be identified as having a 90% chance of being within 50 meters of an actual position, but in reality is hundreds of miles away, etc.). In some implementations discussed herein, techniques and structures are provided for generating "reliability" metrics that are capable of more accurately predicting position error blowout type situations. As used herein, the term "reliability" relates to a metric that gauges how dependable an estimation result is while the term "uncertainty" relates to a metric that gauges an amount by which an estimated result may differ from an actual value.

With reference to FIG. 3, SPS receiver 72 may generate a position fix and an associated reliability metric and deliver this information to one or more location based applications 76. Location based application(s) 76 may include any local application that relies on a position estimate for mobile device 70. Such applications may include, for example, pedestrian or vehicle navigation, point-of-interest identification, vehicle or personnel tracking, location for emergency services dispatching, travel routing services (e.g., finding a travel route having the lowest traffic congestion, etc.), and/or many others. The location based application(s) 76 may be executed within, for example, one or more digital processing devices of mobile device 70 (e.g., DSP 34 of FIG. 2). SPS receiver 72 may also deliver the position fix and associated reliability information to one or more remote entities via wireless transceiver 74.

As illustrated in FIG. 3, SPS receiver 72 may include, for example, SPS receiver channels 78, a satellite acquisition manager 80, a position fix computation unit 82, and a reliability determination unit 84. In various implementations, the SPS receiver channels 78, satellite acquisition manager 80, position fix computation unit 82, and reliability determination unit 84 may be implemented in hardware, firmware, software, or a combination thereof. In at least one implementation, some or all of the satellite acquisition manager 80, the position fix computation unit 82, and the reliability determination unit 84 may be implemented within one or more digital processors either inside or outside of SPS receiver 72. SPS receiver channels 78 may include a number of individual receiver channels that may each be capable of sensing, demodulating, and decoding signals from a corresponding positioning satellite of an SPS. SPS receiver channels 78 may include at least four receiver channels and, more typically, may include more than four channels. Satellite acquisition manager 80 may be operative for searching for and "acquiring" positioning satellites in an SPS for use in performing position estimation, using the SPS receiver channels 78. In some implementations, satellite acquisition manager 80 may be capable of using assistance data to expedite a satellite acquisition process. An individual receiver channel of SPS receiver channels 78 may be dedicated to each satellite acquired by satellite acquisition manager 80 (although less than all acquired satellites may be used in some instances).

Position fix computation unit 82 is operative for generating the position fix of the SPS receiver 72 using acquired SPS signals. In addition to acquired SPS signals, position fix computation unit 82 may also use external position injection (EPI) data to generate the position fix in some instances. EPI data may include location data for mobile device 70 that is obtained from a source or sources other than acquired positioning satellites. In some implementations, EPI data may include, for example, latitude, longitude, and associated horizontal position uncertainty data; altitude and associated altitude uncertainty data; an indication of the age of the EPI data; a reliability indicator that applies to both horizontal and vertical EPI data; and/or other location-based data. This information may be received from one or more external sources via, for example, wireless transceiver 74 of mobile device 70 and/or one or more other sensors of mobile device 70. In some implementations, two-dimensional (horizontal) EPI data may be used without corresponding altitude information. EPI data may also have a maximum useable age in some implementations (e.g., 10 seconds, etc.). The reliability of the EPI information may be affected by factors such as, for example, a source of the EPI information and/or other information accompanying the EPI information as received.

Many different sources of approximate location information may be available to a mobile device. For example, a mobile device that is also part of a terrestrial wireless network, such as a cellular network or WLAN, may derive an estimate of its location using knowledge of the location of an associated base station or network access point of the wireless network. As pointed out above, uncertainty associated with these location estimates may vary significantly depending, at least in part, on such a location estimate is derived (e.g., from acquisition of a signal transmitted from an 802.11 std. access point or identification of a current cell in a cellular communication network) With reference to FIG. 1, for example, if mobile device 12 is currently associated with base station 22 of a wireless cellular system, mobile device 12 may assume that it is within a coverage area or "cell" of base station 22. This position information may be delivered to a corresponding SPS receiver of mobile device 12 for use in generating a position fix. In another possible approach, a mobile device may scan a surrounding environment for signals from base stations or access points in the region and use these signals to calculate an approximate position (e.g., using triangulation, trilateration, or some similar technique). In still another approach, a mobile device may use a former position estimate generated by an SPS receiver as an indication of position. In some implementations, an estimate of position may be calculated by using a previous position fix and knowledge of the movement of the mobile device since the previous fix was computed. In this case, on-board sensors such as accelerometers may be used to improve the uncertainty estimate of the previous fix position. In other scenarios, a mobile device may use input from a user to determine a location estimate. In another possible technique, an on-board camera or other image capture device of a mobile device may be used to capture images of a surrounding environment from which a location estimate may be implied. Many other techniques, including combinations of techniques, may be used to determine approximate location of a mobile device for use as EPI.

In some implementations, the position fix computation unit 82 may use a weighted least-squares (WLS) approach in generating a position solution. If an WLS approach is used, horizontal and vertical EPI components may, in some instances, be treated as two independent sources of information in a WLS solution. In one possible approach, the horizontal EPI position may be represented in the WLS solution using East and North constraints (i.e., measurement equations) where the associated a priori measurement residuals are computed with respect to the initial position of the WLS. In another possible approach, the WLS position and covariance matrix may be initialized using the EPI position and uncertainty. For this approach, the WLS solution is linearized only once and subsequent iterations cannot be performed. Therefore, if the change in the solution relative to the initialization is significant, the may contain additional error.

The reliability determination unit 84 is operative for calculating a reliability metric for the position fix generated by position fix computation unit 82. As will be described in greater detail, reliability determination unit 84 may, in various implementations, utilize EPI information that was used to generate a "position fix in generating the reliability metric. In addition, in various implementations, reliability determination unit 84 may use information about a number of "degrees-of-freedom" in a position fix solution in generating a reliability metric. A number of degrees-of-freedom in a solution may be described as a number of values in the solution that may be independently varied. In some implementations, degrees-of-freedom may be determined using, for example, a difference between a number of equations and a number of unknowns in a position fix solution. As will be appreciated, an equal number of equations and unknowns is generally required to be able to solve for all unknowns. If there are more equations than unknowns, a certain amount of redundancy may exist that may allow for an increased level of reliability in a solution.

In a single SPS solution, the number of unknowns may be four (e.g., 3 position dimensions plus clock bias). The number of unknowns in a solution may be increased by one, in some implementations, for each of the following that is true: (a) the solution resolves the SPS time error by accounting for the effect of the satellite velocity on the user-to-satellite range (this is known as a solve-for-time (SFT) position fix); and (b) the solution includes both GPS and GLONASS measurements, and resolves the offset between the GPS and GLONASS system time. This offset is known as the GPS to GLONASS time bias (GGTB). The number of equations may be greater than or equal to the number of satellite measurements. The number of equations in a solution may be increased by one, in some implementations, for each of the following that is true: (a) altitude is constrained, and (b) GGTB is constrained. Other or alternative criterion for adjusting a number of unknowns or a number of equations may be used in other implementations.

In some implementations, the degrees-of-freedom of a solution may be increased if an EPI is used in the solution. For example, if an EPI is used that specifies horizontal position only and does not include altitude, the degrees-of-freedom of the solution may be increased by two in some implementations. Similarly, if an EPI is used that specifies both horizontal position and altitude, the degrees-of-freedom of the solution may be increased by three in some implementations. In certain implementations, a position fix may not be computed unless the degrees-of-freedom without the EPI is zero or above. In other words, a minimum amount of SPS content is required in each solution and the internal fix rate remains unchanged by usage of the EPI. As an example of the degrees-of-freedom for a specific case, an SFT fix that includes 2 GPS measurements, 2 GLONASS measurements, an altitude constraint, a GGTB constraint, and an EPI may have 2 degrees-of freedom in some implementations.

In certain implementations, a reliability indicator for EPI information may assume one of the following states: (a) unknown, (b) very-low, (c) low, (d) medium, and (e) high. If EPI reliability is unknown, EPI may be ignored or assumed to be low reliability. If EPI reliability is very-low, the EPI will be ignored. If EPI reliability is low, this means EPI has little or no redundancy. If EPI reliability is medium, this means EPI has a medium level of redundancy. If EPI reliability is high, this means EPI may be fully trusted. In some implementations, EPI may be sent on a periodic basis (e.g., 0.1 Hz in one implementation) until a sufficiently accurate SPS solution has been computed.

Table 1 is a table that may be used to determine a reliability metric for a position fix in an SPS receiver using a WLS solution in an implementation. In at least one implementation, reliability determination unit 84 of FIG. 3 may use Table 1 to determine the reliability of position fixes generated by position fix computation unit 82. With reference to Table 1, a first column of the table describes a degree-of-freedom of an SPS solution by itself without the use of EPI information. As described previously, this may comprise the difference between the number of unknowns in a solution (e.g., four) and the number of equations (e.g., the number of acquired satellites for which SPS signals or pseudoranges have been obtained). The second column of Table 1 identifies whether EPI information has been used in a particular solution instance and a type of EPI information used. For example, the second column of Table 1 shows that in the first 6 rows of the table, no EPI information is used in the position solution. In the remaining five rows, however, a two dimensional (i.e., horizontal) EPI is used in the solution.

The third column of Table 1 describes a degree-of-freedom of the full solution, including any EPI use. As shown, if EPI data is not used, the degree-of-freedom does not change from the first column to the third column. If two-dimensional EPI is used, on the other hand, the degree-of-freedom from the first column increases by two in the third column. The fourth column of Table 1 indicates the reliability of the EPI input. As discussed previously, in some implementations, the reliability of EPI information may assume one of the following states: (a) unknown, (b) very-low, (c) low, (d) medium, and (e) high.

The fifth column of Table 1 indicates whether a solution is to be computed for the various different scenarios set forth in the table. As shown, solutions may be computed unless the degree-of-freedom of the SPS solution by itself, without the use of EPI information, is less than zero. The sixth column of Table 1 identifies the reliability of the position fix solution for each of the different scenarios set out in the

TABLE 1

| Inputs | | | | Outputs | | | |
|---|---|---|---|---|---|---|---|
| Degrees-of-Freedom | | | Reliability | | Reliability | Fault | Fault |
| DOF of SPS Only | DOF of EPI | DOF of Solution | Of EPI Input | Solution is Computed | Of Output Solution | Detection is Possible | Isolation is Possible |
| <0  | N/A | N/A | N/A | No  | N/A  | N/A | N/A |
| 0   | N/A | 0   | N/A | Yes | Low  | No  | No  |
| 1   | N/A | 1   | N/A | Yes | Med  | Yes | No  |
| 2   | N/A | 2   | N/A | Yes | Med  | Yes | Yes |
| >=3 | N/A | >=3 | N/A | Yes | High | Yes | Yes |
| <0  | N/A | N/A | N/A | No  | N/A  | N/A | N/A |
| 0   | 2-D | 2   | Low/Med  | Yes | Med  | Yes | No  |
| 0   | 2-D | 2   | High     | Yes | High | Yes | No  |
| 1   | 2-D | 3   | Low      | Yes | Med  | Yes | Yes |
| >=2 | 2-D | >=4 | Low      | Yes | Med  | Yes | Yes |
| >=1 | 2-D | >=3 | Med/High | Yes | High | Yes | Yes | table. Referring to a fourth row of Table 1, for example, the reliability of a position solution that has an overall degree-of-freedom of two and that does not use EPI information is medium. Similarly, referring to an eighth row of Table 1, the reliability of a position solution that uses two dimensional EPI information, that has an overall degree-of-freedom of two, and that has high reliability EPI input is high, and so on. It should be appreciated that Table 1 represents one example of how reliability information may be generated based on, for example, degree-of-freedom information and EPI reliability information. Other alternative implementations also exist. For example, in some implementations, three dimensional EPI information may be used in some scenarios. The seventh and eighth columns of Table 1 indicate whether fault detection is possible and whether fault isolation is possible, respectively, for the various scenarios in the table.

The reliability as derived from Table 1 may be deprecated, for example, depending on a combined SPS and EPI geometry. In certain cases, despite a sufficiently large number of degrees-of-freedom, detection and/or isolation of a faulty measurement may not be possible due to in-sufficient redundancy. In such cases, a position fix error may be significantly higher than a position uncertainty. The protection limit is a parameter computed to determine how large a measurement fault can be without being detected or isolated. If the protection limit is found to be substantially higher than the position fix uncertainty, the reliability is reduced to low.

As described above, Table 1 describes an example technique for determining a reliability metric for a position fix in an SPS receiver using a WLS solution. Similar techniques may be used for other solution types. For example, if a Kalman filter approach is used to compute a position fix, the reliability of the associated position may be inferred based concurrent WLS reliability and the offset between the WLS and Kalman filter positions. In another approach, the degree-of-freedom of the Kalman filter solution may be calculated as a difference between the number of SPS measurements and four. The reliability of the Kalman filter solution may then be specified as, for example, as one of the following: (1) medium if 1≤DOF≤2 and unit fault uncertainty <30; (2) high if DOF>3 and unit fault uncertainty <30; and (3) low in other cases. In some implementations, if the reliability of the EPI is high, it may be used to initialize the Kalman filter directly. A decrease in the Kalman filter reliability may be filtered to prevent thrashing. An increase in reliability may be reflected immediately.

In some implementations, for example, a determined reliability metric associated with a position fix may be displayed to a user of a mobile device and/or used by a client application. In some other implementations, a determined reliability metric may be displayed to a user and/or used by a client application in combination with one or more other metrics indicative of an uncertainty or accuracy of a position fix.

Figure 4:
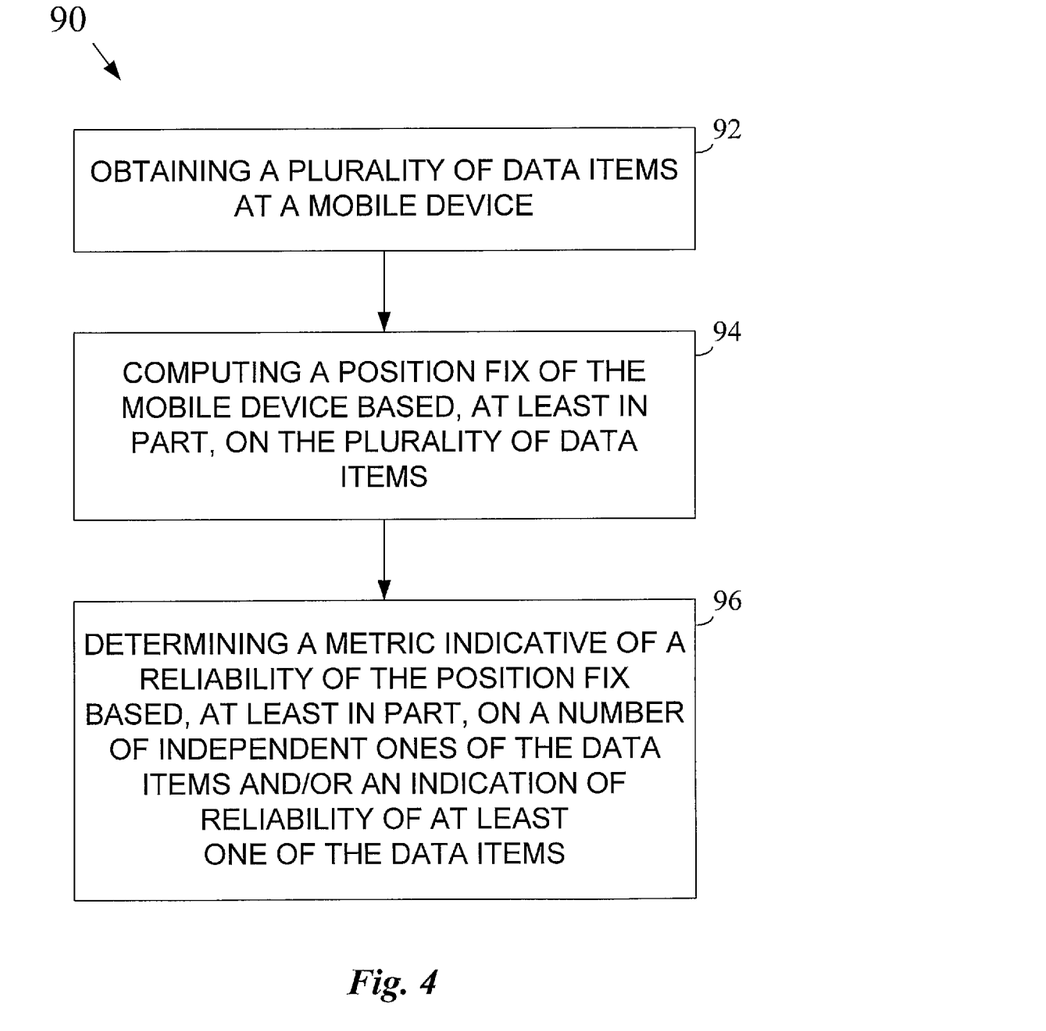
FIG. 4 is a flowchart illustrating an example method for generating a metric that is related to a positioning accuracy of a position fix in accordance with an implementation.

FIG. 4 is a flowchart illustrating an example method 90 for generating a metric that is related to a reliability of a position fix in accordance with an implementation. First, a plurality of data items are obtained at a mobile device (block 92). A position fix of the mobile device may then be computed based, at least in part, on the plurality of data items (block 94). A metric that is indicative of a reliability of the position fix may then be determined based, at least in part, on a number of independent ones of the data items and/or an indication of reliability of at least one of the data items (block 96). In some implementations, the plurality of data items may include, for example, one or more SPS signals or corresponding pseudoranges associated with satellites of an SPS. The plurality of data items may also, in some instances, include one or more externally obtained positions or EPI data. If used to compute the position fix, an externally obtained position may include associated reliability information. In some implementations, this position (or EPI) reliability information may be used to generate the metric that is indicative of a reliability of the position fix.

In some implementations, a degree-of-freedom may be determined based on the plurality of data items. This degree-of-freedom information may be used to generate the metric that is indicative of a reliability of the position fix. The determination of the degree-of-freedom may include, for example, determining a difference between a number of equations and a number of unknowns of a position solution. The number of unknowns may be four, in some implementations, representing three position dimensions plus clock bias. The number of equations may be related to the number of acquired satellites for which an SPS signal has been received (e.g., the number of pseudoranges that have been determined).

If an externally obtained position may be used for the solution, a fixed increment may be added to the difference to determine an overall degree-of-freedom of the solution in some implementations. The position fix may, in some implementations, include an estimated location of the mobile device and a measurement of accuracy of the estimated location. Table 1 described above illustrates one example technique for using degree-of-freedom information and EPI reliability information to determine a reliability of a position fix in an implementation.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein can be implemented by various means depending upon the application. For example, these methodologies can be implemented in hardware, firmware, software, or a combination thereof. For hardware implementations, processing may be implemented within, for example, one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, methodologies can be implemented with modules (e.g., procedures, functions, and so on) that perform functions described herein. Any machine readable digital medium tangibly embodying instructions can be used in implementing methodologies described herein. For example, software codes can be stored in a storage medium and executed by a processing unit. Storage can be implemented within a processing unit or external to a processing unit. As used herein, the terms "storage medium," "storage media," "storage device," "digital storage," or the like refer to any type of long term, short term, volatile, nonvolatile, or other storage structures and are not to be limited to any particular type of memory or number of memories, or type of media upon which data is stored.

If implemented in firmware and/or software, the functions may be stored as one or more instructions or code on a computer readable medium. Examples include computer readable media encoded with a data structure and computer readable media encoded with a computer program. Computer-readable media may take the form of an article of manufacture. Computer-readable media includes physical computer storage media. A computer readable storage medium may be any available digital medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Techniques described herein may be implemented in conjunction with various wireless communication networks such as, for example, a wireless wide area network (WWAN), a wireless local area network (WLAN), a wireless personal area network (WPAN), and so on. The terms "network" and "system" may be used interchangeably. The terms "position" and "location" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as, for example, cdma2000, Wideband-CDMA (W-CDMA), and so on. Cdma2000 may include IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma 2000 is described in documents from a consortium named "3rd Generation Partnership Project 2" (3GPP2). 3GPP and 3GPP2 documents are publicly available. A WLAN may be, for example, an IEEE 802.11x network or some other type of network. A WPAN may be, for example, a Bluetooth network, an IEEE 802.15x network, or some other type of network. Techniques disclosed herein may also be implemented in conjunction with any combination of WWAN, WLAN, and/or WPAN.

As used herein, the term "mobile device" refers to a device such as a cellular telephone, smart phone, or other wireless communication device; a personal communication system (PCS) device; a personal navigation device (PND); a Personal Information Manager (PIM); a Personal Digital Assistant (PDA); a laptop computer; a tablet computer; a portable media player; or other suitable mobile or portable device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, the term "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Designation that something is "optimized," "required," or other similar designation does not indicate that the current disclosure applies only to systems that are optimized, or systems in which the "required" elements are present (or other limitation due to other designations). These designations refer only to the particular described implementation.

Of course, many implementations are possible. The techniques can be used with protocols other than those discussed herein, including protocols that are in development or to be developed.

In the preceding detailed description, numerous specific details have been set forth to provide a thorough understanding of claimed subject matter. However, it will be understood by those skilled in the art that claimed subject matter may be practiced without these specific details. In other instances, methods or structures that would be known by one of ordinary skill have not been described in detail so as not to obscure claimed subject matter.

Some portions of the preceding detailed description have been presented in terms of logic, algorithms, or symbolic representations of operations on binary states stored within a storage medium of a specific apparatus or special purpose computing device or platform. In the context of this particular specification, the term specific apparatus or the like may include a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," "estimating," "initializing," or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

A computer-readable storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting space vehicles (SVs) or satellites. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to particular disclosed examples, but that such claimed subject matter may also include all aspects falling within the scope of appended claims, and equivalents thereof.

What is claimed is:

1. A machine implemented method for determining a metric for a position fix solution of a mobile device, comprising:
   obtaining a plurality of first data items at the mobile device, the plurality of first data items comprising at least one external position injection (EPI) data item and at least one reliability indicator for the at least one EPI data item, the at least one reliability indicator indicating one or more predefined states of reliability;
   computing the position fix solution of the mobile device based, at least in part, on the plurality of first data items; and
   determining a metric indicative of a reliability of the computed position fix solution based, at least in part, on the at least one reliability indicator for the at least one EPI data item and on an input number of degrees-of-freedom of the plurality of first data items.

2. The method of claim 1, wherein:
determining the input number of degrees-of-freedom provided by the plurality of first data items includes determining a difference between a number of equations and a number of unknowns of the position fix solution based, at least in part, on the plurality of first data items.

3. The method of claim 2, wherein:
at least a second data item within the plurality of first data items comprises an externally obtained position; and
determining the input number of degrees-of-freedom provided by the plurality of first data items further includes adding a fixed increment to the difference based, at least in part, on the externally obtained position.

4. The method of claim 1, wherein:
at least a second data item within the plurality of first data items comprises an externally obtained position;
wherein determining the metric further comprises determining the metric based, at least in part, on an indication of reliability of the externally obtained position.

5. The method of claim 1, wherein:
the position fix solution comprises an estimated location of the mobile device and a measurement of accuracy of the estimated location.

6. The method of claim 1, wherein the one or more predefined states of reliability comprise one or more of: unknown, very low, low, medium, or high.

7. An apparatus comprising:
a position fix computation unit to compute a position fix solution of the apparatus based, at least in part, on a plurality of first data items, the plurality of first data items comprising at least one external position injection (EPI) data item and at least one reliability indicator for the at least one EPI data item, the at least one reliability indicator indicating one or more predefined states of reliability; and
a reliability determination unit to determine a metric indicative of a reliability of the computed position fix solution based, at least in part, on the at least one reliability indicator for the at least one EPI data item and on an input number of degrees-of-freedom of the plurality of first data items.

8. The apparatus of claim 7, wherein:
the reliability determination unit is to determine the input number of degrees-of-freedom based, at least in part, on a difference between a number of equations and a number of unknowns of the position fix solution.

9. The apparatus of claim 8, wherein:
at least a second data item within the plurality of first data items comprises an externally obtained position; and
the reliability determination unit is to determine the input number of degrees-of-freedom by adding a fixed increment to the difference based, at least in part, on the externally obtained position.

10. The apparatus of claim 8, wherein:
at least a second data item within the plurality of first data items comprises an externally obtained position; and
the reliability determination unit is to determine the metric based, at least in part, on an indication of reliability of the externally obtained position.

11. The apparatus of claim 7, wherein:
the position fix solution comprises an estimated location of the apparatus and a measurement of uncertainty of the estimated location.

12. The apparatus of claim 7, wherein the one or more predefined states of reliability comprise one or more of: unknown, very low, low, medium, or high.

13. An article comprising:
a non-transitory storage medium having machine-readable instructions stored thereon which are executable by a special purpose computing apparatus to:
obtain a plurality of first data items at a mobile device, the plurality of first data items comprising at least one external position injection (EPI) data item and at least one reliability indicator for the at least one EPI data item, the at least one reliability indicator indicating one or more predefined states of reliability;
compute a position fix solution of the mobile device based, at least in part, on the plurality of first data items; and
determine a metric indicative of a reliability of the computed position fix solution based, at least in part, on the at least one reliability indicator for the at least one EPI data item and on an input number of degrees-of-freedom of the plurality of first data items.

14. The article of claim 13, wherein the machine-readable instructions to determine the input number of degrees-of-freedom include instructions to determine a difference between a number of equations and a number of unknowns of the position fix solution based, at least in part, on the plurality of first data items.

15. The article of claim 14, wherein:
at least a second data item within the plurality of first data items comprises an externally obtained position; and
the machine-readable instructions to determine the input number of degrees-of-freedom include instructions to add a fixed increment to the difference based, at least in part, on the externally obtained position.

16. The article of claim 13, wherein:
at least one second data item within the plurality of first data items comprises an externally obtained position;
wherein the machine-readable instructions to determine the metric further comprise instructions to determine the metric based, at least in part, on an indication of reliability of the externally obtained position.

17. The article of claim 13, wherein the one or more predefined states of reliability comprise one or more of: unknown, very low, low, medium, or high.

18. An apparatus for determining a metric for a position fix solution of a mobile device, comprising:
means for obtaining a plurality of first data items at the mobile device, the plurality of first data items comprising at least one external position injection (EPI) data item and at least one reliability indicator for the at least one EPI data item, the at least one reliability indicator indicating one or more predefined states of reliability;
means for computing the position fix solution of the mobile device based, at least in part, on the plurality of first data items; and
means for determining a metric indicative of a reliability of the computed position fix solution based, at least in part, on the at least one reliability indicator for the at least one EPI data item and on an input number of degrees-of-freedom of the plurality of first data items.

19. The apparatus of claim 18, wherein:
the means for determining the input number of degrees-of-freedom provided by the plurality of first data items includes means for determining a difference between a number of equations and a number of unknowns of a position solution based, at least in part, on the plurality of first data items.

20. The apparatus of claim 19, wherein:
at least a second data item within the plurality of first data items comprises an externally obtained position; and
the means for determining the input number of degrees-of-freedom provided by the plurality of first data items further includes means for adding a fixed increment to the difference based, at least in part, on the externally obtained position.

21. The apparatus of claim 18, wherein:
at least a second data item within the plurality of first data items comprises an externally obtained position; and
the means for determining the metric further comprises means for determining the metric based, at least in part, on an indication of reliability of the externally obtained position.

22. The apparatus of claim 18, wherein the one or more predefined states of reliability comprise one or more of: unknown, very low, low, medium, or high.

* * * * *